(12) United States Patent
Watanabe

(10) Patent No.: US 8,646,553 B2
(45) Date of Patent: Feb. 11, 2014

(54) CONSTRUCTION MACHINE PROVIDED WITH HEAT EXCHANGER

(75) Inventor: Hirofumi Watanabe, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 191 days.

(21) Appl. No.: 13/365,598

(22) Filed: Feb. 3, 2012

(65) Prior Publication Data

US 2012/0234513 A1 Sep. 20, 2012

(30) Foreign Application Priority Data

Mar. 16, 2011 (JP) ................................ 2011-057973

(51) Int. Cl.
*B60K 13/06* (2006.01)

(52) U.S. Cl.
USPC ......................................... 180/68.3; 180/68.2

(58) Field of Classification Search
USPC ................................ 180/68.1, 68.2, 68.3, 68.4
See application file for complete search history.

(56) References Cited

U.S. PATENT DOCUMENTS

| | | | | |
|---|---|---|---|---|
| 3,540,540 | A * | 11/1970 | Schwab ........................ | 180/68.4 |
| 5,490,572 | A * | 2/1996 | Tajiri et al. .................... | 180/65.1 |
| 5,549,153 | A * | 8/1996 | Baruschke et al. ............. | 165/42 |
| 5,671,820 | A * | 9/1997 | Kobayashi et al. ........... | 180/68.1 |
| 5,730,237 | A * | 3/1998 | Matsuki et al. ............... | 180/65.1 |
| 6,450,275 | B1 * | 9/2002 | Gabriel et al. ............. | 180/65.23 |
| 6,540,036 | B1 * | 4/2003 | Sugano ........................ | 180/68.1 |
| 6,655,486 | B2 * | 12/2003 | Oshikawa et al. ........... | 180/68.1 |
| 6,922,925 | B2 * | 8/2005 | Watanabe et al. ................ | 37/466 |
| 7,143,852 | B2 * | 12/2006 | Yatsuda et al. ................ | 180/69.2 |
| 7,284,594 | B2 * | 10/2007 | Sanada et al. .................... | 165/41 |
| 7,389,840 | B2 * | 6/2008 | Makuta et al. ............. | 180/65.31 |
| 7,823,671 | B2 * | 11/2010 | Inoue et al. .................... | 180/68.4 |
| 7,828,097 | B2 * | 11/2010 | Kondou et al. .............. | 180/68.1 |
| 7,841,314 | B2 * | 11/2010 | Nakashima et al. ...... | 123/198 E |
| 8,047,318 | B2 * | 11/2011 | Zhu et al. ...................... | 180/68.2 |
| 8,104,435 | B2 * | 1/2012 | Schwartz et al. .......... | 123/41.12 |

(Continued)

FOREIGN PATENT DOCUMENTS

| | | |
|---|---|---|
| EP | 1 260 637 A1 | 11/2002 |
| EP | 1 832 731 A1 | 9/2007 |

(Continued)

OTHER PUBLICATIONS

Extended Search Report issued Aug. 2, 2012 in European Application No. 12155057.8.

*Primary Examiner* — Jeffrey J Restifo
(74) *Attorney, Agent, or Firm* — Oblon, Spivak, McClelland, Maier & Neustadt, L.L.P.

(57) ABSTRACT

Provided is a construction machine comprising: a heat exchanger with a core surface in an engine room; a top wall covering an air inlet chamber in the engine room and having a first air inlet; a duct including a main wall guiding air in the air inlet chamber to draw it through the core surface and a front wall facing the core surface and having a second air inlet; a cooling fan sucking external air onto the core surface through the second air inlet; and an air cleaner extending horizontally and orthogonally to an air guiding direction by the main wall. At least a part of the air cleaner exists in a vertical region where the second air inlet is formed. The air cleaner directs, toward the second air inlet, an air flow farthest from the duct, out of the air flow drawn downward through the first air inlet.

6 Claims, 2 Drawing Sheets

(56) References Cited

U.S. PATENT DOCUMENTS

| | | | | |
|---|---|---|---|---|
| 8,215,434 | B2* | 7/2012 | Matsushita et al. | 180/68.4 |
| 8,459,388 | B2* | 6/2013 | Kim | 180/68.4 |
| 8,459,389 | B2* | 6/2013 | Myers et al. | 180/68.4 |
| 8,479,855 | B2* | 7/2013 | Kim et al. | 180/68.3 |
| 8,494,698 | B2* | 7/2013 | Murata et al. | 701/22 |
| 8,499,869 | B2* | 8/2013 | Cimatti et al. | 180/68.1 |
| 2002/0073726 | A1* | 6/2002 | Hasebe et al. | 62/323.1 |
| 2003/0056404 | A1* | 3/2003 | Iwasa et al. | 37/347 |
| 2005/0274507 | A1* | 12/2005 | Sanada et al. | 165/202 |
| 2006/0169507 | A1* | 8/2006 | Inoue et al. | 180/68.4 |
| 2008/0169142 | A1* | 7/2008 | Kinoshita et al. | 180/68.1 |
| 2008/0223319 | A1* | 9/2008 | Nakashima et al. | 123/41.66 |
| 2009/0139781 | A1* | 6/2009 | Straubel | 180/65.1 |
| 2009/0183936 | A1* | 7/2009 | Kim et al. | 180/68.4 |
| 2010/0025136 | A1* | 2/2010 | Matsushita et al. | 180/68.3 |
| 2010/0116458 | A1* | 5/2010 | Kim | 165/41 |
| 2010/0121508 | A1* | 5/2010 | Murata et al. | 701/22 |

FOREIGN PATENT DOCUMENTS

| | | |
|---|---|---|
| JP | 11-193547 | 7/1999 |
| JP | 2006-206034 | 8/2006 |
| JP | 2006-207576 | 8/2006 |
| JP | 2011-46217 | 3/2011 |

* cited by examiner

CONSTRUCTION MACHINE PROVIDED WITH HEAT EXCHANGER

BACKGROUND OF THE INVENTION

1. Field of the Invention

The present invention relates to a construction machine provided with a heat exchanger for cooling e.g. engine cooling water, a duct for guiding air to cool the heat exchanger, and an air cleaner for filtering engine inlet air.

2. Description of the Background Art

The background art of the invention will be explained by describing a hydraulic excavator shown in FIG. 3 and FIG. 4, as an example.

The hydraulic excavator has an upper slewing body 1, which is provided with an engine room 4 at a rear part thereof. The engine room 4 is covered with a guard member such as an engine guard 2 and a counterweight 3, accommodating therein an engine 5, a hydraulic pump 6, a heat exchanger 7, a cooling fan 8, a duct 13, and an air cleaner 16.

The engine 5 is disposed in a posture extending laterally, that is, in left and right directions. The hydraulic pump 6 is disposed on one of the lateral sides of the engine 5 (on the right side in FIG. 3 and in FIG. 4), and the heat exchanger 7 is disposed on the other of the lateral sides (on the left side in FIG. 3 and in FIG. 4) to cool a fluid to be cooled (e.g. engine cooling water). The cooling fan 8 sucks the external air into the engine room 4 to draw the external air through the heat exchanger 7.

In the engine room 4, there is formed an air inlet chamber 9 for drawing the air sucked by the cooling fan 8 to the air inlet side of the heat exchanger 7. The counterweight 3 has left and right side portions 3a and 3b, disposed so as to locate the side portions 3a and 3b at the lateral sides of the engine room 4 and make the left side portion 3a define the air inlet chamber 9. Each of the side portions 3a, 3b is formed with a window-hole like maintenance opening 10, and a maintenance panel 11 to open and close the maintenance opening 10. The part of the side portions 3a, 3b which part surrounds the maintenance opening 10 and the maintenance panel 11 in a closed state define a recess 12 in an inner portion of the maintenance panel 11.

The duct 13, which is adapted to guide the external air sucked by the cooling fan 8 to the heat exchanger 7, has a box-like shape with a main wall 13b disposed upstream of the heat exchanger 7 and a front wall 13a located on the air inlet side of a core surface 7a of the heat exchanger 7 to face the core surface 7a. The engine guard 2 is formed with a first air inlet 14 for drawing the external air into the air inlet chamber 9 therethrough, in the region constituting a top wall of the air inlet chamber 9 and the front wall 13a of the duct 13 is formed with a second air inlet 15 attached with a not graphically shown filter. The first and second air inlets 14 and 15 and the main wall 13b of the duct 13 define an inlet passage turning in an L-shape so as to shift the direction of external air introduced downward through the first air inlet 14 to a lateral direction through the second air inlet 15 to thereby apply the external air onto the core surface 7a of the heat exchanger 7. Besides, downstream of the heat exchanger 7a, a fan shroud 23 is interposed between the heat exchanger 7 and the cooling fan 8.

The air cleaner 16, which is adapted to filter the engine inlet air, is formed into a substantially tubular shape. The air cleaner 16 is disposed in the air inlet chamber 9. In detail, the air cleaner 16 is disposed in a lateral posture extending longitudinally, that is, in front and rear directions, inside the duct 13, in the same manner as disclosed in Japanese Unexamined Patent Publication No. 2006-206034.

The upper slewing body 1 has an upper frame 17 as a base thereof and a cabin 18 disposed at a front left part of the upper frame 17. The "left and right directions" and the "front and rear directions" described below indicate respective directions viewed from an operator seated in the cabin 18.

The background art described above has a drawback that the air cleaner 16 disposed in the duct 13 interferes with a smooth air flow (cooling air) directed from the second air inlet 15 toward the core surface 7a of the heat exchanger 7. Specifically, the air sucked into the air inlet chamber 9 is deflected into a part of the core surface 7a so as to avoid the air cleaner 16, which lowers the air sucking efficiency and causes a shortage in the air volume required for the heat exchanger 7 to thus lower the cooling performance of the heat exchanger 7. Besides, increasing the speed of the cooling fan 8 to secure the required air volume for the heat exchanger 7 may increase the operating sound of the cooling fan 8 and raise the level of noise leaking to the outside. This causes a requirement of improved measures against the noise, resulting in increased cost.

SUMMARY OF THE INVENTION

An object of the invention is to provide a construction machine having an engine room covered with a cover member, the engine room accommodating a heat exchanger, a cooling fan for forming the air flow to cool the heat exchanger, and an air cleaner, while the air cleaner can be prevented from interfering with air flow for cooling a heat exchanger.

Provided by the invention is a construction machine having an engine room covered with a cover member and an engine disposed in the engine room, the construction machine further comprising: a heat exchanger which is disposed in the engine room and has a core surface; a top wall which covers an air inlet chamber formed on an air inlet side of the heat exchanger in the engine room from above and has a first air inlet for drawing an external air into the air inlet chamber therethrough; a duct which includes a main wall guiding an air in the air inlet chamber to draw the air through the core surface of the heat exchanger and a front wall located on an air inlet side of the core surface to face the core surface, the front wall being formed with a second air inlet; a cooling fan which sucks the external air downward into the air inlet chamber through the first air inlet to draw the external air onto the core surface of the heat exchanger through the second air inlet of the duct; and an air cleaner which is disposed outside the duct in the air inlet chamber to filter an engine inlet air. The air cleaner is disposed, in a posture extending horizontally and orthogonally to a direction in which the main wall of the duct guides the air, at such a position that at least a part of the air cleaner is located vertically in a region where the second air inlet is formed, and that the air cleaner itself directs, toward the second air inlet, at least an air flow farthest from the duct, out of the air flow drawn downward through the first air inlet.

These and other objects, features and advantages of the present invention will become more apparent upon reading the following detailed description along with the accompanying drawings.

DESCRIPTION OF THE PREFERRED EMBODIMENTS

Figure 1:
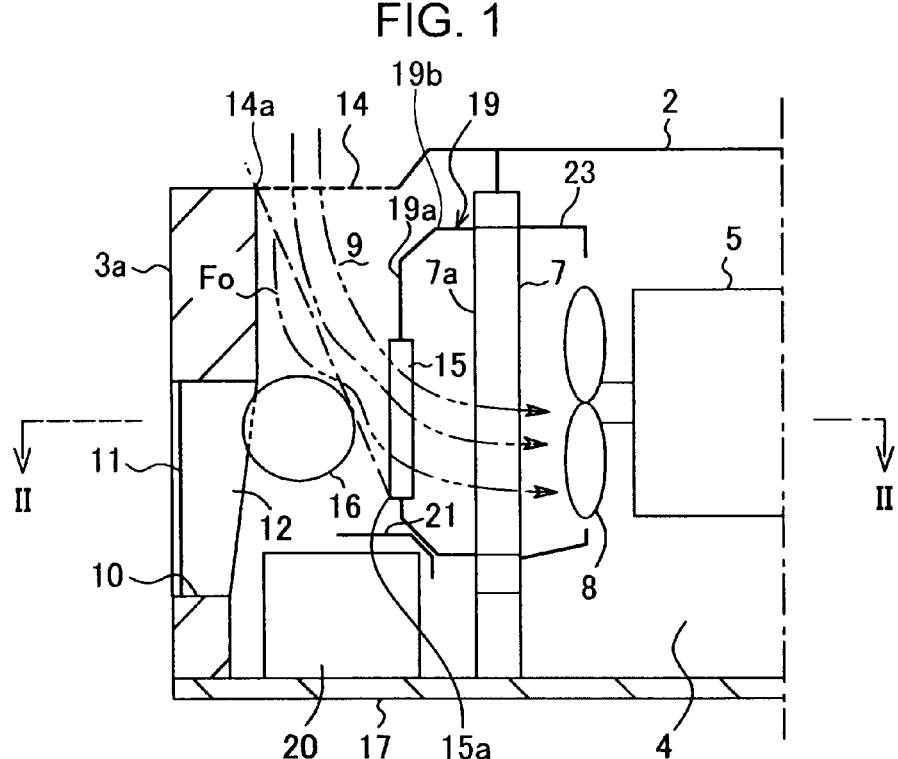
FIG. 1 is a cross-sectional view of essential parts of a construction machine embodying the invention, when viewed from a rear side of the construction machine.
Figure 2:
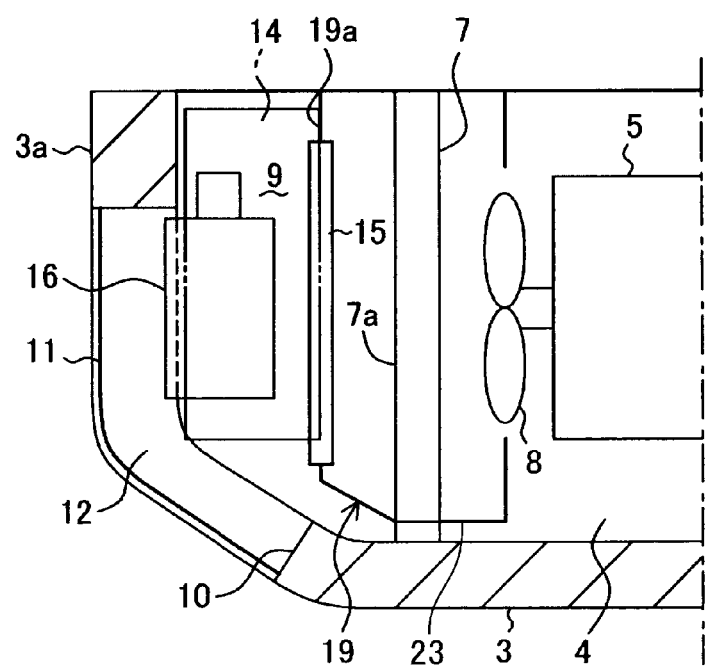
FIG. 2 is a cross-sectional view taken along the line II-II in FIG. 1.

An embodiment of the invention is described with reference to FIG. 1 and FIG. 2.

This embodiment is directed to a hydraulic excavator. The hydraulic excavator is provided with an upper slewing body 1 having substantially the same arrangement as the upper slewing body 1 shown in FIG. 3. The upper slewing body 1 has an upper frame 17 as a base thereof. There is disposed an engine room 4 covered with a guard member such as an engine guard 2 and a counterweight 3, at a rear part of the upper slewing body 1. In the engine room 4 disposed are an engine 5, a hydraulic pump 6 having substantially the same arrangement as the hydraulic pump 6 shown in FIG. 3, a heat exchanger 7, a cooling fan 8, a duct 19, and an air cleaner 16.

The engine 5 is disposed in a posture extending laterally, that is, in left and right directions, of the construction machine. The hydraulic pump 6 is disposed on one of the lateral sides of the engine 5 (on the right side in FIG. 3 and in FIG. 4), and the heat exchanger 7 is disposed on the other of the lateral sides (on the left side in FIG. 3 and in FIG. 4). The heat exchanger 7 has a core surface 7a in which a fluid to be cooled (e.g. engine cooling water) is cooled by air flow. The cooling fan 8 sucks the external air into the engine room 4 to draw the external air through the heat exchanger 7. Examples of the heat exchanger 7 include a cooling device such as a radiator for cooling engine cooling water, an oil cooler for cooling oil, or an intercooler, and an apparatus containing a plurality of the above cooling devices arranged in parallel to each other.

In the engine room 4, there is formed an air inlet chamber 9 for drawing the air sucked by the cooling fan 8 into the air inlet side of the heat exchanger 7. The counterweight 3 has left and right side portions 3a and 3b and is disposed so as to locate the side portions 3a and 3b at the lateral sides of the engine room 4 and allow the left side portion 3a to define the air inlet chamber 9. Each of the side portions 3a and 3b is formed with a window-hole like maintenance opening 10 and a maintenance panel 11 for opening and closing the maintenance opening 10, and a part of the side portions 3a, 3b which part surrounds the maintenance opening 10 and the maintenance panel 11 in a closed state define a recess 12 inside the maintenance panel 11.

The duct 19, which is adapted to guide the external air sucked by the cooling fan 8 to the heat exchanger 7, has a box-like shape including a main wall 19b disposed upstream of the heat exchanger 7 to guide the air in the air inlet chamber 9 so as to draw the air through the core surface 7a and a front wall 19a located on the air inlet side of the core surface 7a of the heat exchanger 7 to face the core surface 7a. The main wall 19b has a tubular shape to air-tightly enclose the air passage including the core surface 7a in vertical and longitudinal directions (in the depth direction in FIG. 1).

The engine guard 2 has a portion constituting a top wall of the air inlet chamber 9, which portion is formed with a first air inlet 14 for drawing the external air into the air inlet chamber 9 therethrough, while the front wall 19a of the duct 19 is formed with a second air inlet 15 attached with a not graphically shown filter. The first and second air inlets 14 and 15 and the main wall 19b of the duct 19 form an inlet passage turning in L-shape so as to shift the direction of external air drawn downward through the first air inlet 14 to a lateral direction through the second air inlet 15 to draw the external air into the core surface 7a of the heat exchanger 7. Besides, downstream side of the heat exchanger 7, a fan shroud 23 is interposed between the heat exchanger 7 and the cooling fan 8.

Figure 3:
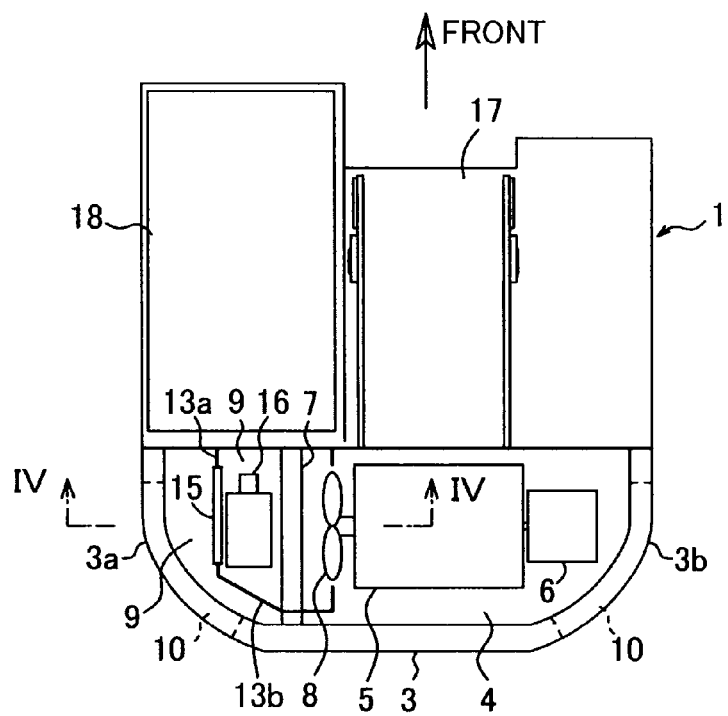
FIG. 3 is a top plan view of an upper slewing body of a conventional hydraulic excavator.

The air cleaner 16, which is adapted to filter the engine inlet air, is formed into a substantially tubular shape. The air cleaner 16 is disposed in the air inlet chamber 9 in such a posture as to extend longitudinally, i.e. in a horizontal direction orthogonal to the direction in which the main wall 19b guides the air, in the same manner as shown in FIG. 3; however, the air cleaner 16 is disposed on the outside and the air inlet side of the duct 19 in such a manner that: at least a part of the air cleaner 16 is located vertically, that is, with respect to a vertical direction, in a region where the second air inlet 15 is formed; and the air cleaner 16 directs, toward the second air inlet 15, an air flow Fo farthest (on the left side in FIG. 1) from the duct 19, out of the air flow drawn downward into the air inlet chamber 9 through the first air inlet 14. The air cleaner 16 has an outer surface of a tubular shape, the axis of which is aligned with a longitudinal direction i.e. a horizontal direction orthogonal to the direction in which the main wall 19b guides the air.

Furthermore, the air cleaner 16 according to this embodiment is disposed so as to meet the following requirements (A) through (C).

(A) The air cleaner 16 is entirely below a straight line L linking an outer end 14a of the first air inlet 14 farthest from the duct 19 and an outer lower end 15a of the second air inlet 15 on the side of the air inlet chamber 9 (on the left side in FIG. 1), and the outer surface of the air cleaner 16 is in proximity to the straight line L.

(B) The air cleaner 16 is located at a turning point of the L-shaped inlet passage, that is, at a position where the direction of the air flow Fo on the outer periphery side is shifted. In other words, the air cleaner 16 is so disposed that at least a part of air drawn downward through the first air inlet 14 blows against the air cleaner 16 to thereby shift the direction of air flow toward the second air inlet 15.

(C) The air cleaner 16 is in proximity to an upper end portion of the recess 12 to be defined by a part of the left side portion 3a of the counterweight 3 which part surrounds the maintenance opening 10 and the maintenance panel 11.

Figure 4:
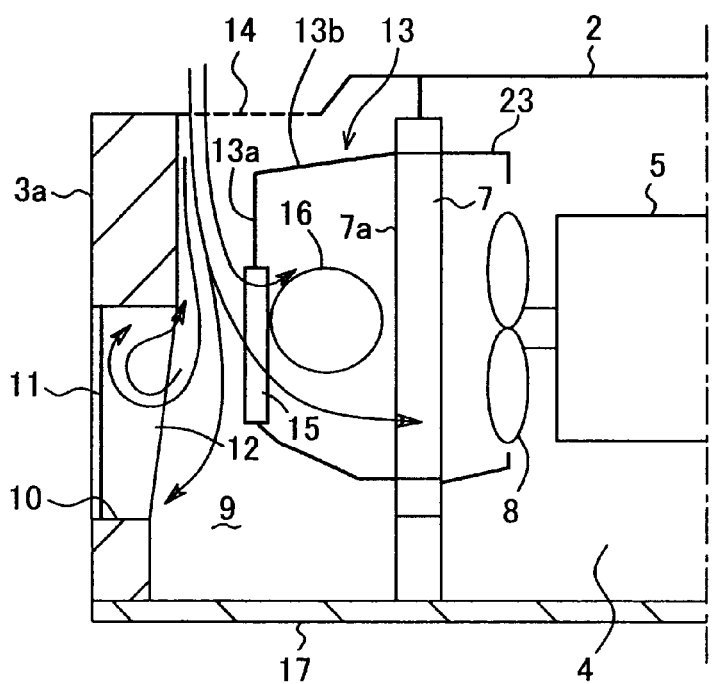
FIG. 4 is an enlarged sectional view taken along the line IV-IV in FIG. 3.

In this example, the duct 19 has a lateral size smaller than that of the duct 13 shown in FIG. 3 and FIG. 4 so as to secure a space for installing the air cleaner 16 outside the duct 19.

The hydraulic excavator of this embodiment is further provided with a battery 20 for accessories. The battery 20 is installed, in a bottom portion of the air inlet chamber 9, below the air cleaner 16. Specifically, the relative positional relationship between the air cleaner 16 and the battery 20 is so set that the air cleaner 16 covers at least a part of the battery 20 when viewed from above, preferably, covers substantially a left half part of the battery 20 as shown in FIG. 1. Besides, in the air inlet chamber 9, a rainwater cover 21 is so provided as to cover substantially a right half part of the battery 20 from above.

The air cleaner 16 for the hydraulic excavator as described above, disposed outside the duct 19 within the air inlet chamber 9, does not interfere with the air flow guided by the duct 19 and allows the air to be drawn smoothly and uniformly onto the entire core surface 7a of the heat exchanger 7. Furthermore, the air cleaner 16, disposed so as to direct the air flow Fo on the outer periphery side in the air inlet chamber 9 to the second air inlet 15, not only does not interfere with the air flow directed toward the second air inlet 15, but also performs a rectifying function of guiding the air flow Fo on the outer periphery side toward the second air inlet 15, in spite of the installment of the air cleaner 16 on the air inlet side of the duct 19 in the air inlet chamber 9. In particular, the tubular outer surface of the air cleaner 16 extending longitudinally is able to more smoothly guide the air flow Fo on the outer periphery side to the second air inlet 15. This guide allows the overall air flow within the air inlet chamber 9 to be rectified to the flow toward the second air inlet 15.

The air cleaner 16 of this embodiment further provides the following advantages because of meeting the above requirements (A) through (C).

Regarding the requirement (A), the air cleaner 16, disposed below the straight line L linking the outer end 14a of the first air inlet 14 and the lower end 15a of the second air inlet 15 so as to locate the outer surface of the air cleaner 16 in proximity to the straight line L, is able to draw almost of the total volume of air flowing on the outer periphery side to the second air inlet 15, in other words, is able to allow the air sucked into the air inlet chamber 9 to enter into the duct 19 through the entire second air inlet 15. This enhances the effect of uniformly drawing the air onto the entirety of the core surface 7a of the heat exchanger 7.

Regarding the requirement (B), the air cleaner 16, disposed at the turning point of the L-shaped inlet passage, that is, at a position where the direction of the air flow Fo on the outer periphery side is shifted, in other words, disposed at such a position that at least a part of air drawn downward through the first air inlet 14 blows against the air cleaner 16 to thereby turn to the second air inlet 15, enhancing the effect of rectifying the air flow. Regarding the requirement (C), the air cleaner 16, located in proximity to an upper end portion of the recess 12 of the left side portion 3a of the counterweight 3, is capable of interfering with the downward air flow to increase the volume of air to be supplied to the second air inlet 15 while suppressing the air flow into the recess 12 to thereby suppress the generation of a whirling flow of air due to the air inflow; this enhances the air volume performance.

Thus, the arrangement of the air cleaner 16 according to this embodiment enables the overall air flow in the air inlet chamber 9 to be rectified into an air flow toward the second air inlet 15, thereby making it possible to secure a required air volume without increasing the speed of the cooling fan 8. In short, the arrangement establishes both of low noise and high cooling performance.

Besides, the air cleaner 16 according to this embodiment, disposed so as to cover the air cleaner 16 substantially a left half part of the battery 20 from above, is capable of serving as a part of a rainwater cover, thereby allowing the size of the rainwater cover 21 as a dedicated member to be reduced, resulting in reduced cost.

The invention is not limited to the foregoing embodiment but includes, for example, the following modifications.

(1) Although the air cleaner 16 is preferably located in proximity to the straight line L while entirely disposed below the straight line, the invention does not exclude at least an arrangement where the center of the air cleaner 16 is positioned below the straight line L and most of the outer surface of the air cleaner 16 is disposed below the straight line L while only a part of the outer surface portion slightly juts above the straight line L. In summary, the air cleaner 16 only has to be disposed so as to retain the function of guiding the air flow Fo on the outer periphery side in the air inlet chamber 9 toward the second air inlet 15.

(2) The duct of the invention is not limited to one formed as an individual box-shape body like the duct 19 according to the embodiment. For instance, the duct may be formed of a cover member surrounding the engine room 4 or a plate member bulging from e.g. an attachment frame for the heat exchanger 7.

(3) The air cleaner according to the invention, though disposed so as to cover substantially a left half part of the battery 20 from above according to the above embodiment, may be disposed so as to cover a region other than the left half part of the battery 20, or only a region of the area smaller than the area of the left half part of the battery 20, depending on the size or the position of the battery 20.

As described above, the invention provides a construction machine having an engine room covered with a cover member, wherein the engine room accommodating a heat exchanger, a cooling fan for forming the air flow to cool the heat exchanger, and an air cleaner, while the air cleaner can be prevented from interfering with air flow for cooling a heat exchanger by the air cleaner.

The construction machine provided by the invention has an engine room covered with a cover member and an engine disposed in the engine room, further comprising: a heat exchanger which is disposed in the engine room and has a core surface; a top wall which covers an air inlet chamber formed on an air inlet side of the heat exchanger in the engine room above the air inlet chamber and has a first air inlet for drawing an external air into the air inlet chamber; a duct which includes a main wall guiding an air in the air inlet chamber to draw the air through the core surface of the heat exchanger and a front wall located on an air inlet side of the core surface to face the core surface, the front wall being formed with a second air inlet; a cooling fan which sucks the external air downward into the air inlet chamber through the first air inlet to draw the external air onto the core surface of the heat exchanger through the second air inlet of the duct; and an air cleaner which is disposed outside the duct in the air inlet chamber to filter an engine inlet air. The air cleaner is disposed, in a posture extending horizontally and orthogonally to a direction in which the main wall of the duct guides the air, at such a position that at least a part of the air cleaner is located vertically (with respect to a vertical direction) in a region where the second air inlet is formed, and that the air cleaner itself directs, toward the second air inlet, at least an air flow farthest from the duct, out of the air flow drawn downward through the first air inlet.

The thus disposed air cleaner, located in the air inlet chamber but outside the duct, does not interfere with the air flow inside the duct and allows the air to flow smoothly, thereby enhancing the uniformity of the air to be drawn onto the core surface of the heat exchanger.

Furthermore, the air cleaner, disposed at such a position as to direct, to the second air inlet, an air flow farthest from the duct on the outer periphery side, out of the air flow to be drawn into the air inlet chamber, not only does not interfere with the air flow directed toward the second air inlet, but also perform a rectifying function of guiding the air flow on the outer periphery side toward the second air inlet, in spite of the installment of the air cleaner on the air inlet side of the duct in the air inlet chamber. In particular, if having a tubular outer surface extending horizontally and orthogonally to the direction in which the main wall of the duct guides the air, the air cleaner is able to more smoothly guide the air flow on the outer periphery side to the second air inlet. The guide allows the overall air flow within the air in the air inlet chamber to be rectified into a flow toward the second air inlet.

The aforementioned feature makes it possible to secure an air volume required for cooling the core surface of the heat exchanger, without increasing the speed of the cooling fan.

More specifically, it is preferable that the air cleaner be disposed below a straight line linking an outer end of the first air inlet farthest from the duct and a lower end of the second air inlet on a side of the air inlet chamber, at such a position that an outer surface of the air cleaner is in proximity to the straight line. The thus disposed air cleaner is able to draw substantially the whole volume of air flowing on the outer periphery side to the second air inlet. In other words, the air cleaner is able to draw the air sucked into the air inlet chamber into the duct through the approximately entire second air inlet to thereby enhance uniformity of the air to be drawn onto the core surface of the heat exchanger.

As to the relationship with respect to the aforementioned straight line, the air cleaner, though preferably disposed entirely below the straight line and in proximity to the straight line, may be disposed, for instance, at such a position that the center of the air cleaner is below the straight line and most of the outer surface of the air cleaner is below the straight line while only a part of the outer surface slightly juts above the straight line. In summary, the air cleaner only has to be disposed so as to retain the function of guiding the air flow on the outer periphery side toward the second air inlet.

Besides, the air cleaner is preferably disposed so that at least a part of air drawn downward through the first air inlet blows against the air cleaner to thereby shift a direction of the air toward the second air inlet. The thus disposed air cleaner is capable of more positively guiding the air flow on the outer periphery side to the second air inlet, thereby enhancing the rectifying effect.

There may be a case that: the cover member may include a counterweight having left and right side portions positioned at lateral sides of the engine room and installed so that one of the side portions defines the air inlet chamber; the side portion of the cover member defining the air inlet chamber may have a maintenance opening and a maintenance panel to open and close the maintenance opening; and the maintenance panel and a portion of the side portion surrounding the maintenance opening when the maintenance panel is closed define a recess. In this case, the air cleaner, if being disposed in proximity to an upper end portion of the recess, can increase the volume of air drawn into the second air inlet. For instance, in the hydraulic excavator shown in FIG. 3 and FIG. 4, a part of the air sucked into the air inlet chamber 9 is drawn downward so as to pass through the second air inlet 15, as shown in the arrow in FIG. 4, resulting in a fear of reducing the volume of air flowing on the side of the duct 13. Furthermore, a part of the thus downward drawn air is likely to enter into the recess 12 defined in the side portion 3a of the counterweight 3 to form a whirling flow and stagnate thereat. This also reduces the volume of air to be drawn into the duct 13. In contrast, the air cleaner disposed in proximity to the upper end portion of the recess is able to interfere with the downward straight air flow to increase the volume of air supplied to the second air inlet, while suppressing an air inflow into the recess and generation of a whirling flow of air resulting due to the air inflow, resulting in enhancing the air volume performance with respect to the second air inlet.

The construction machine according to this invention may further include a battery disposed in a bottom portion of the air inlet chamber. In this arrangement, the air cleaner, if disposed so as to cover at least a part of the battery from above, can reduce the cost of the construction machine. Specifically, with respect to a battery disposed in the air inlet chamber, it is preferable to dispose a rainwater cover for blocking rainwater intruded through the first air inlet from falling onto the battery at a position above the battery: in this arrangement, the air cleaner disposed as described above also functions as a rainwater cover to thereby reducing the size of an exclusive rainwater cover, thus reducing the cost.

This application is based on Japanese Patent Application No. 2011-057973 filed on Mar. 16, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A construction machine provided with an engine room covered with a cover member, and an engine disposed in the engine room, the construction machine comprising:
   a heat exchanger which is disposed in the engine room and has a core surface;
   a top wall which covers an air inlet chamber formed on an air inlet side of the heat exchanger in the engine room from above and has a first air inlet for drawing an external air into the air inlet chamber therethrough;
   a duct including a main wall guiding an air in the air inlet chamber to draw the air through the core surface of the heat exchanger, and a front wall located on an air inlet side of the core surface to face the core surface, the front wall being formed with a second air inlet;
   a cooling fan which sucks the external air downward into the air inlet chamber through the first air inlet to draw the external air onto the core surface of the heat exchanger through the second air inlet of the duct; and
   an air cleaner which is disposed outside the duct in the air inlet chamber to filter an engine inlet air, the air cleaner disposed, in a posture extending horizontally and orthogonally to a direction in which the main wall of the duct guides the air, at such a position that at least a part of the air cleaner is located vertically in a region where the second air inlet is formed, and that the air cleaner itself directs, toward the second air inlet, at least an air flow farthest from the duct, out of the air flow drawn downward through the first air inlet.

2. The construction machine according to claim 1, wherein the air cleaner has a tubular outer surface whose axis extends horizontally and orthogonally to a direction in which the main wall of the duct guides the air.

3. The construction machine according to claim 1, wherein the air cleaner is disposed below a straight line linking an outer end of the first air inlet farthest from the duct and a lower end of the second air inlet on a side of the air inlet chamber, at such a position that an outer surface of the air cleaner is in proximity to the straight line.

4. The construction machine according to claim 1, wherein the air cleaner is disposed so that at least a part of air drawn downward through the first air inlet blows against the air cleaner to thereby shift a direction of the air toward the second air inlet.

5. The construction machine according to claim 1, wherein: the cover member includes a counterweight having left and right side portions at lateral sides of the engine room, one of the side portions defining the air inlet chamber; the side portion of the cover member defining the air inlet chamber has a maintenance opening and a maintenance panel to open and close the maintenance opening; the maintenance panel and a portion of the side portion surrounding the maintenance opening when the maintenance panel is closed define a recess; and the air cleaner is disposed in proximity to an upper end portion of the recess.

6. The construction machine according to claim 1, further comprising a battery which is disposed in a bottom portion of the air inlet chamber, the air cleaner being disposed so as to cover at least a part of the battery from above.

* * * * *